(12) United States Patent
Lai et al.

(10) Patent No.: US 11,385,864 B2
(45) Date of Patent: Jul. 12, 2022

(54) COUNTER BASED MULTIPLY-AND-ACCUMULATE CIRCUIT FOR NEURAL NETWORK

(71) Applicant: Facebook Technologies, LLC, Menlo Park, CA (US)

(72) Inventors: Liangzhen Lai, Fremont, CA (US); Pierce I-Jen Chuang, Sunnyvale, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 380 days.

(21) Appl. No.: 16/460,719

(22) Filed: Jul. 2, 2019

(65) Prior Publication Data
US 2021/0004208 A1  Jan. 7, 2021

(51) Int. Cl.
*G06F 7/544* (2006.01)
*G06N 3/08* (2006.01)

(52) U.S. Cl.
CPC ............. *G06F 7/5443* (2013.01); *G06N 3/08* (2013.01)

(58) Field of Classification Search
CPC .................................. G06F 7/5443; G06N 3/08
See application file for complete search history.

(56) References Cited

U.S. PATENT DOCUMENTS

| | | | |
|---|---|---|---|
| 5,912,833 A | 6/1999 | Jang et al. | |
| 6,408,320 B1 | 6/2002 | Shiell | |
| 6,820,106 B1 | 11/2004 | Vijayrao et al. | |
| 2018/0046906 A1* | 2/2018 | Dally | ........................ G06N 3/04 |

OTHER PUBLICATIONS

International Search Report and Written Opinion on PCT/US2020/038782 dated Oct. 22, 2020.

* cited by examiner

*Primary Examiner* — Michael D. Yaary
(74) *Attorney, Agent, or Firm* — Foley & Lardner LLP (57) ABSTRACT

Disclosed herein includes a system, a method, and a device for improving computation efficiency of a neural network. In one aspect, adder circuitry is configured to add input data from processing of the neural network and a first number of bits of accumulated data for the neural network to generate summation data. In one aspect, according to a carry value of the adding from the adder circuitry, a multiplexer is configured to select between i) a second number of bits of the accumulated data and ii) incremented data comprising the second number of bits of the accumulated data incremented by a predetermined value. The summation data appended with the selected one of the second number of bits of the accumulated data or the incremented data may form appended data.

20 Claims, 7 Drawing Sheets

COUNTER BASED MULTIPLY-AND-ACCUMULATE CIRCUIT FOR NEURAL NETWORK

FIELD OF DISCLOSURE

The present disclosure is generally related to a processing mechanism for a neural network, including but not limited to a multiply and accumulate circuit for the neural network using a counter or an incrementor.

BACKGROUND

Recent development in neural networks allows various artificial intelligence (AI) tasks such as computer vision, speech recognition, machine translation, social network filtering, playing board and video games, and medical diagnosis, etc., to be automatically performed. In one implementation, a neural network includes a network of nodes that model neurons in a human brain. Nodes may perform computations such as multiply-accumulate operations on their inputs, and provide, transmit or forward computation results to their subsequent nodes. The subsequent nodes then may perform computations such as multiply-accumulate operations on the computation results from their preceding nodes as their inputs, and provide, transmit, or forward additional computation results to their subsequent nodes. According to the computations through a large network of nodes (e.g., including more than thousands or more than millions), AI tasks may be performed. However, performing multiply-accumulate operations for a large number of nodes may be computationally expensive and may delay the AI tasks.

SUMMARY

Various embodiments disclosed herein are related to a multiply and accumulate circuit for a neural network. In some embodiments, the multiply and accumulate circuit includes adder circuitry configured to generate summation data by adding input data from processing of the neural network and a first number of bits of accumulated data for the neural network. In some embodiments, the multiply and accumulate circuit includes a multiplexer configured to select, according to a carry value of the adding by the adder circuitry, between i) a second number of bits of the accumulated data and ii) incremented data comprising the second number of bits of the accumulated data incremented by a predetermined value. In some embodiments, the summation data appended with the selected one of the second number of bits of the accumulated data or the incremented data form appended data.

In some embodiments, the multiplexer is configured to select the second number of bits of the accumulated data, in response to the carry value of the adding being zero. In some embodiments, the multiplexer is configured to select the incremented data, in response to the carry value of the adding being one. In some embodiments, the adder circuitry is configured to provide the first number of bits of the appended data to an input of the adder circuitry for a subsequent clock cycle. In some embodiments, the multiplexer is configured to provide the second number of bits of the appended data to an input of the multiplexer for a subsequent clock cycle. In some embodiments, the multiply and accumulate circuit includes incrementing circuitry configured to increment the second number of bits of the appended data by one to generate the incremented data and provide the incremented data to an additional input of the multiplexer. In some embodiments, the multiplexer includes a control input coupled to a carry output of the adder circuitry and configured to receive the carry value of the adding from the carry output of the adder circuitry.

In some embodiments, the multiply and accumulate circuit includes multiplier circuitry including an output coupled to an input of the adder circuitry. In some embodiments, the multiplier circuitry is configured to multiply first data and second data to generate the input data. In some embodiments, the first data is weight of the neural network and the second data is an activation value of the neural network. In some embodiments, the first data has a third number of bits, and the second data has the third number of bits, where the first number is twice of the third number.

Various embodiments disclosed herein are related to a method for a neural network. In some embodiments, the method includes adding, by adder circuitry, input data from processing of the neural network and a first number of bits of accumulated data for the neural network to generate summation data. In some embodiments, the method includes selecting, by a multiplexer, according to a carry value of the adding from the adder circuitry, between i) a second number of bits of the accumulated data and ii) incremented data comprising the second number of bits of the accumulated data incremented by a predetermined value. In some embodiments, the summation data appended with the selected one of the second number of bits of the accumulated data or the incremented data form appended data.

In some embodiments, the selecting includes selecting, by the multiplexer, the second number of bits of the accumulated data, in response to the carry value of the adding being zero. In some embodiments, the selecting includes selecting, by the multiplexer, the incremented data, in response to the carry value of the adding being one. In some embodiments, the method includes providing, by the adder circuitry, the first number of bits of the appended data from an output of the adder circuitry to an input of the adder circuitry for a subsequent clock cycle. In some embodiments, the method includes providing, by the multiplexer, the second number of bits of the appended data from an output of the multiplexer to an input of the multiplexer for a subsequent clock cycle. In some embodiments, the method includes incrementing, by incrementing circuitry, the second number of bits of the accumulated data from the output of the multiplexer by one to generate the incremented data. In some embodiments, the method includes providing, by the incrementing circuitry, the incremented data to an additional input of the multiplexer. In some embodiments, the method includes receiving, at a control input of the multiplexer, the carry value of the adding from a carry output of the adder circuitry.

In some embodiments, the method includes multiplying, by multiplier circuitry, first data and second data to generate the input data. In some embodiments, the first data is weight of the neural network and the second data is an activation value of the neural network. In some embodiments, the first data has a third number of bits, and the second data has the third number of bits, where the first number is twice of the third number.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

For purposes of reading the description of the various embodiments of the present invention below, the following descriptions of the sections of the specification and their respective contents may be helpful:

Section A describes an environment, system, configuration and/or other aspects useful for practicing or implementing an embodiment of the present systems, methods and devices; and Section B describes embodiments of devices, systems and methods for multiply-accumulate operations for neural networks based on a counter or an incrementor.

A. Environment for Artificial Intelligence Related Processing

Figure 1A:
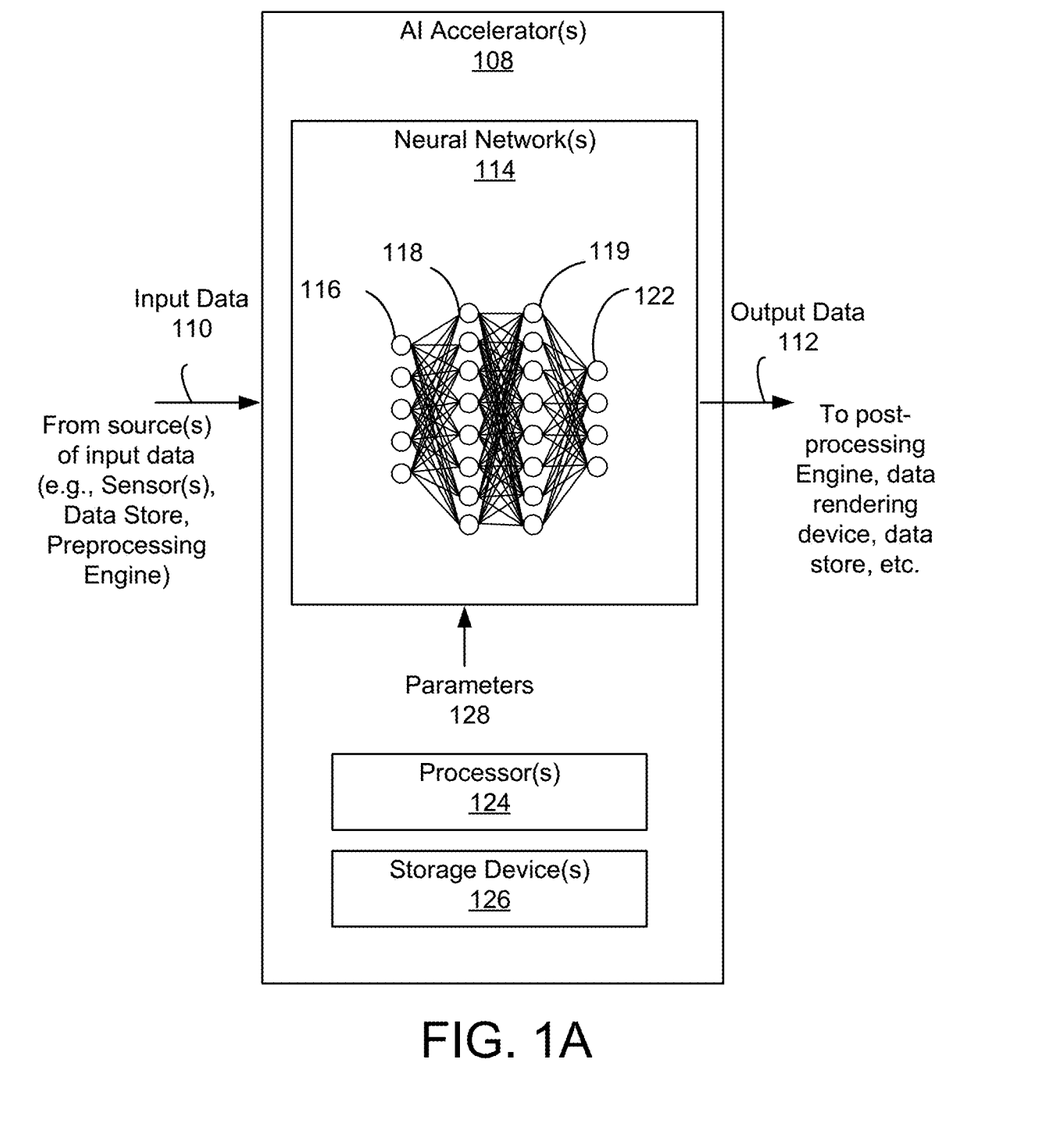
FIG. 1A is a block diagram of an embodiment of a system for performing artificial intelligence (AI) related processing, according to an example implementation of the present disclosure.

Prior to discussing the specifics of embodiments of systems, devices and/or methods in Section B, it may be helpful to discuss the environments, systems, configurations and/or other aspects useful for practicing or implementing certain embodiments of the systems, devices and/or methods. Referring now to FIG. 1A, an embodiment of a system for performing artificial intelligence (AI) related processing is depicted. In brief overview, the system includes one or more AI accelerators 108 that can perform AI related processing using input data 110. Although referenced as an AI accelerator 108, it is sometimes referred as a neural network accelerator (NNA), neural network chip or hardware, AI processor, AI chip, etc. The AI accelerator(s) 108 can perform AI related processing to output or provide output data 112, according to the input data 110 and/or parameters 128 (e.g., weight and/or bias information). An AI accelerator 108 can include and/or implement one or more neural networks 114 (e.g., artificial neural networks), one or more processor(s) 24 and/or one or more storage devices 126.

Each of the above-mentioned elements or components is implemented in hardware, or a combination of hardware and software. For instance, each of these elements or components can include any application, program, library, script, task, service, process or any type and form of executable instructions executing on hardware such as circuitry that can include digital and/or analog elements (e.g., one or more transistors, logic gates, registers, memory devices, resistive elements, conductive elements, capacitive elements).

The input data 110 can include any type or form of data for configuring, tuning, training and/or activating a neural network 114 of the AI accelerator(s) 108, and/or for processing by the processor(s) 124. The neural network 114 is sometimes referred to as an artificial neural network (ANN). Configuring, tuning and/or training a neural network can refer to or include a process of machine learning in which training data sets (e.g., as the input data 110) such as historical data are provided to the neural network for processing. Tuning or configuring can refer to or include training or processing of the neural network 114 to allow the neural network to improve accuracy. Tuning or configuring the neural network 114 can include, for example, designing, forming, building, synthesizing and/or establishing the neural network using architectures that have proven to be successful for the type of problem or objective desired for the neural network 114. In some cases, the one or more neural networks 114 may initiate at a same or similar baseline model, but during the tuning, training or learning process, the results of the neural networks 114 can be sufficiently different such that each neural network 114 can be tuned to process a specific type of input and generate a specific type of output with a higher level of accuracy and reliability as compared to a different neural network that is either at the baseline model or tuned or trained for a different objective or purpose. Tuning the neural network 114 can include setting different parameters 128 for each neural network 114, fine-tuning the parameters 128 differently for each neural network 114, or assigning different weights (e.g., hyperparameters, or learning rates), tensor flows, etc. Thus, setting appropriate parameters 128 for the neural network(s) 114 based on a tuning or training process and the objective of the neural network(s) and/or the system, can improve performance of the overall system.

A neural network 114 of the AI accelerator 108 can include any type of neural network including, for example, a convolution neural network (CNN), deep convolution network, a feed forward neural network (e.g., multilayer perceptron (MLP)), a deep feed forward neural network, a radial basis function neural network, a Kohonen self-organizing neural network, a recurrent neural network, a modular neural network, a long/short term memory neural network, etc. The neural network(s) 114 can be deployed or used to perform data (e.g., image, audio, video) processing, object or feature recognition, recommender functions, data or image classification, data (e.g., image) analysis, etc., such as natural language processing.

As an example, and in one or more embodiments, the neural network 114 can be configured as or include a convolution neural network. The convolution neural network can include one or more convolution cells (or pooling layers) and kernels, that can each serve a different purpose. The convolution neural network can include, incorporate and/or use a convolution kernel (sometimes simply referred as "kernel"). The convolution kernel can process input data, and the pooling layers can simplify the data, using, for example, non-linear functions such as a max, thereby reducing unnecessary features. The neural network 114 including the convolution neural network can facilitate image, audio or any data recognition or other processing. For example, the input data 110 (e.g., from a sensor) can be passed to convolution layers of the convolution neural network that form a funnel, compressing detected features in the input data 110. The first layer of the convolution neural network can detect first characteristics, the second layer can detect second characteristics, and so on.

The convolution neural network can be a type of deep, feed-forward artificial neural network configured to analyze visual imagery, audio information, and/or any other type or form of input data 110. The convolution neural network can include multilayer perceptrons designed to use minimal preprocessing. The convolution neural network can include or be referred to as shift invariant or space invariant artificial neural networks, based on their shared-weights architecture and translation invariance characteristics. Since convolution neural networks can use relatively less pre-processing compared to other data classification/processing algorithms, the convolution neural network can automatically learn the filters that may be hand-engineered for other data classification/processing algorithms, thereby improving the efficiency associated with configuring, establishing or setting up the neural network 114, thereby providing a technical advantage relative to other data classification/processing techniques.

The neural network 114 can include an input layer 116 and an output layer 122, of neurons or nodes. The neural network 114 can also have one or more hidden layers 118, 119 that can include convolution layers, pooling layers, fully connected layers, and/or normalization layers, of neurons or nodes. In a neural network 114, each neuron can receive input from some number of locations in the previous layer. In a fully connected layer, each neuron can receive input from every element of the previous layer.

Each neuron in a neural network 114 can compute an output value by applying some function to the input values coming from the receptive field in the previous layer. The function that is applied to the input values is specified by a vector of weights and a bias (typically real numbers). Learning (e.g., during a training phase) in a neural network 114 can progress by making incremental adjustments to the biases and/or weights. The vector of weights and the bias can be called a filter and can represent some feature of the input (e.g., a particular shape). A distinguishing feature of convolutional neural networks is that many neurons can share the same filter. This reduces memory footprint because a single bias and a single vector of weights can be used across all receptive fields sharing that filter, rather than each receptive field having its own bias and vector of weights.

For example, in a convolution layer, the system can apply a convolution operation to the input layer 116, passing the result to the next layer. The convolution emulates the response of an individual neuron to input stimuli. Each convolutional neuron can process data only for its receptive field. Using the convolution operation can reduce the number of neurons used in the neural network 114 as compared to a fully connected feedforward neural network. Thus, the convolution operation can reduce the number of free parameters, allowing the network to be deeper with fewer parameters. For example, regardless of an input data (e.g., image data) size, tiling regions of size 5×5, each with the same shared weights, may use only 25 learnable parameters. In this way, the first neural network 114 with a convolution neural network can resolve the vanishing or exploding gradients problem in training traditional multi-layer neural networks with many layers by using backpropagation.

The neural network 114 (e.g., configured with a convolution neural network) can include one or more pooling layers. The one or more pooling layers can include local pooling layers or global pooling layers. The pooling layers can combine the outputs of neuron clusters at one layer into a single neuron in the next layer. For example, max pooling can use the maximum value from each of a cluster of neurons at the prior layer. Another example is average pooling, which can use the average value from each of a cluster of neurons at the prior layer.

The neural network 114 (e.g., configured with a convolution neural network) can include fully connected layers. Fully connected layers can connect every neuron in one layer to every neuron in another layer. The neural network 114 can be configured with shared weights in convolutional layers, which can refer to the same filter being used for each receptive field in the layer, thereby reducing a memory footprint and improving performance of the first neural network 114.

The hidden layers 118, 119 can include filters that are tuned or configured to detect information based on the input data (e.g., sensor data, from a virtual reality system for instance). As the system steps through each layer in the neural network 114 (e.g., convolution neural network), the system can translate the input from a first layer and output the transformed input to a second layer, and so on. The neural network 114 can include one or more hidden layers 118, 119 based on the type of object or information being detected, processed and/or computed, and the type of input data 110.

In some embodiments, the convolutional layer is the core building block of a neural network 114 (e.g., configured as a CNN). The layer's parameters 128 can include a set of learnable filters (or kernels), which have a small receptive field, but extend through the full depth of the input volume. During the forward pass, each filter is convolved across the width and height of the input volume, computing the dot product between the entries of the filter and the input and producing a 2-dimensional activation map of that filter. As a result, the neural network 114 can learn filters that activate when it detects some specific type of feature at some spatial position in the input. Stacking the activation maps for all filters along the depth dimension forms the full output volume of the convolution layer. Every entry in the output volume can thus also be interpreted as an output of a neuron that looks at a small region in the input and shares parameters with neurons in the same activation map. In a convolutional layer, neurons can receive input from a restricted subarea of the previous layer. Typically, the subarea is of a square shape (e.g., size 5 by 5). The input area of a neuron is called its receptive field. So, in a fully connected layer, the receptive field is the entire previous layer. In a convolutional layer, the receptive area can be smaller than the entire previous layer.

The first neural network 114 can be trained to detect, classify, segment and/or translate input data 110 (e.g., by detecting or determining the probabilities of objects, events, words and/or other features, based on the input data 110). For example, the first input layer 116 of neural network 114 can receive the input data 110, process the input data 110 to transform the data to a first intermediate output, and forward the first intermediate output to a first hidden layer 118. The first hidden layer 118 can receive the first intermediate output, process the first intermediate output to transform the first intermediate output to a second intermediate output, and forward the second intermediate output to a second hidden layer 119. The second hidden layer 119 can receive the second intermediate output, process the second intermediate output to transform the second intermediate output to a third intermediate output, and forward the third intermediate output to an output layer 122 for example. The output layer 122 can receive the third intermediate output, process the third intermediate output to transform the third intermediate output to output data 112, and forward the output data 112 (e.g., possibly to a post-processing engine, for rendering to a user, for storage, and so on). The output data 112 can include object detection data, enhanced/translated/augmented data, a recommendation, a classification, and/or segmented data, as examples.

Referring again to FIG. 1A, the AI accelerator 108 can include one or more storage devices 126. A storage device 126 can be designed or implemented to store, hold or maintain any type or form of data associated with the AI accelerator(s) 108. For example, the data can include the input data 110 that is received by the AI accelerator(s) 108, and/or the output data 112 (e.g., before being output to a next device or processing stage). The data can include intermediate data used for, or from any of the processing stages of a neural network(s) 114 and/or the processor(s) 124. The data can include one or more operands for input to and processing at a neuron of the neural network(s) 114, which can be read or accessed from the storage device 126. For example, the data can include input data, weight information and/or bias information, activation function information, and/or parameters 128 for one or more neurons (or nodes) and/or layers of the neural network(s) 114, which can be stored in and read or accessed from the storage device 126. The data can include output data from a neuron of the neural network(s) 114, which can be written to and stored at the storage device 126. For example, the data can include activation data, refined or updated data (e.g., weight information and/or bias information from a training phase for example, activation function information, and/or other parameters 128) for one or more neurons (or nodes) and/or layers of the neural network(s) 114, which can be transferred or written to, and stored in the storage device 126.

In some embodiments, the AI accelerator 108 can include one or more processors 124. The one or more processors 124 can include any logic, circuitry and/or processing component (e.g., a microprocessor) for pre-processing input data for any one or more of the neural network(s) 114 or AI accelerator(s) 108, and/or for post-processing output data for any one or more of the neural network(s) 114 or AI accelerator(s) 108. The one or more processors 124 can provide logic, circuitry, processing component and/or functionality for configuring, controlling and/or managing one or more operations of the neural network(s) 114 or AI accelerator(s) 108. For instance, a processor 124 may receive data or signals associated with a neural network 114 to control or reduce power consumption (e.g., via clock-gating controls on circuitry implementing operations of the neural network 114). As another example, a processor 124 may partition and/or re-arrange data for separate processing (e.g., at various components of an AI accelerator 108, in parallel for example), sequential processing (e.g., on the same component of an AI accelerator 108, at different times or stages), or for storage in different memory slices of a storage device, or in different storage devices. In some embodiments, the processor(s) 124 can configure a neural network 114 to operate for a particular context, provide a certain type of processing, and/or to address a specific type of input data, e.g., by identifying, selecting and/or loading specific weight, activation function and/or parameter information to neurons and/or layers of the neural network 114.

In some embodiments, the AI accelerator 108 is designed and/or implemented to handle or process deep learning and/or AI workloads. For example, the AI accelerator 108 can provide hardware acceleration for artificial intelligence applications, including artificial neural networks, machine vision and machine learning. The AI accelerator 108 can be configured for operation to handle robotics related, internet of things (IoT) related, and other data-intensive or sensor-driven tasks. The AI accelerator 108 may include a multi-core or multiple processing element (PE) design, and can be incorporated into various types and forms of devices such as artificial reality (e.g., virtual, augmented or mixed reality) systems, smartphones, tablets, and computers. Certain embodiments of the AI accelerator 108 can include or be implemented using at least one digital signal processor (DSP), co-processor, microprocessor, computer system, heterogeneous computing configuration of processors, graphics processing unit (GPU), field-programmable gate array (FPGA), and/or application-specific integrated circuit (ASIC). The AI accelerator 108 can be a transistor based, semiconductor based and/or a quantum computing based device.

Figure 1B:
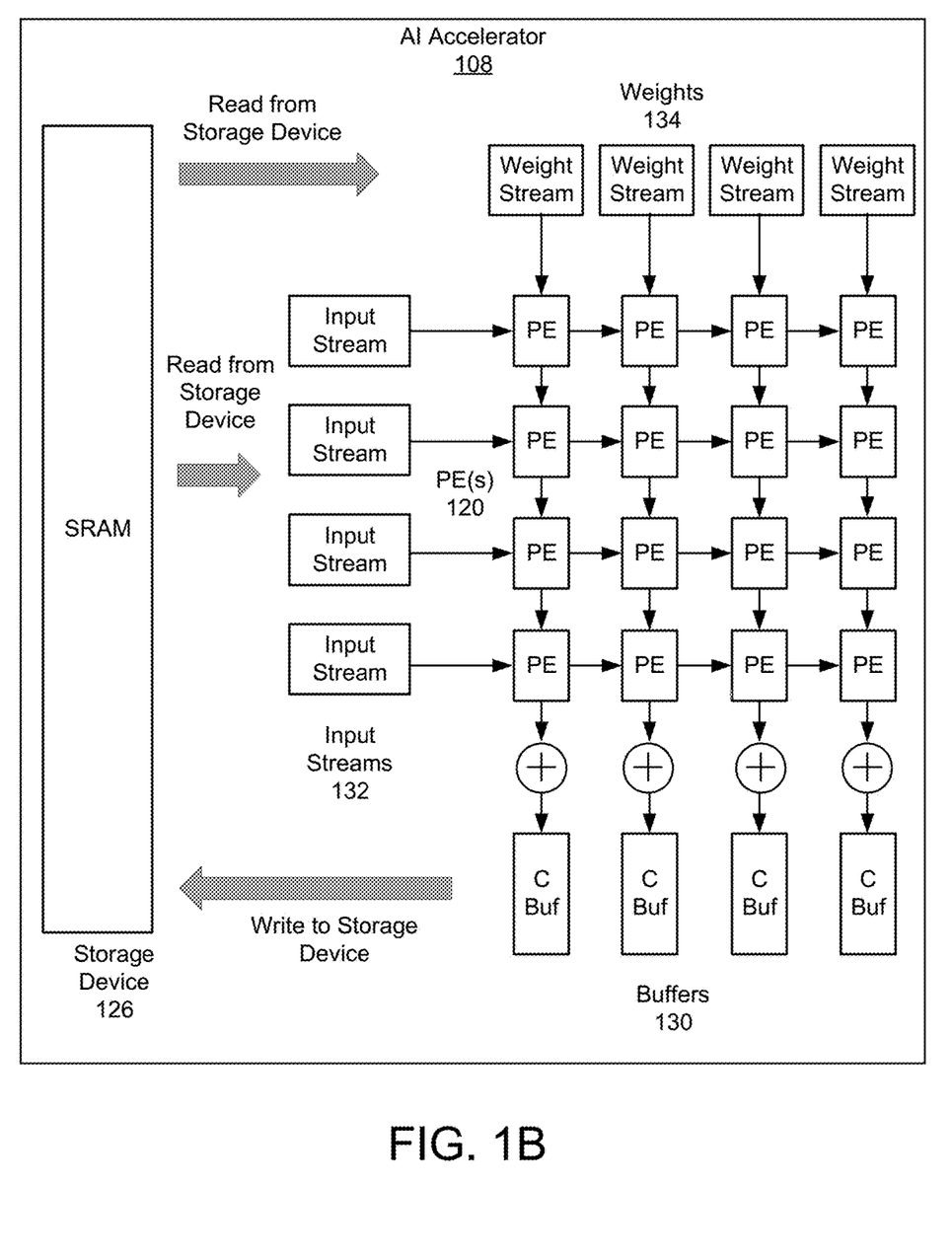
FIG. 1B is a block diagram of an embodiment of a device for performing AI related processing, according to an example implementation of the present disclosure.

Referring now to FIG. 1B, an example embodiment of a device for performing AI related processing is depicted. In brief overview, the device can include or correspond to an AI accelerator 108, e.g., with one or more features described above in connection with FIG. 1A. The AI accelerator 108 can include one or more storage devices 126 (e.g., memory such as a static random-access memory (SRAM) device), one or more buffers, a plurality or array of processing element (PE) circuits, other logic or circuitry (e.g., adder circuitry), and/or other structures or constructs (e.g., interconnects, data buses, clock circuitry, power network(s)). Each of the above-mentioned elements or components is implemented in hardware, or at least a combination of hardware and software. The hardware can for instance include circuit elements (e.g., one or more transistors, logic gates, registers, memory devices, resistive elements, conductive elements, capacitive elements, and/or wire or electrically conductive connectors).

In a neural network 114 (e.g., artificial neural network) implemented in the AI accelerator 108, neurons can take various forms and can be referred to as processing elements (PEs) or PE circuits. The neuron can be implemented as a corresponding PE circuit, and the processing/activation that can occur at the neuron can be performed at the PE circuit. The PEs are connected into a particular network pattern or array, with different patterns serving different functional purposes. The PE in an artificial neural network operate electrically (e.g., in the embodiment of a semiconductor implementation), and may be either analog, digital, or a hybrid. To parallel the effect of a biological synapse, the connections between PEs can be assigned multiplicative weights, which can be calibrated or "trained" to produce the proper system output.

A PE can be defined in terms of the following equations (e.g., which represent a McCulloch-Pitts model of a neuron):

$$\zeta = \Sigma_i w_i x_i \quad (1)$$

$$y = \sigma(\zeta) \quad (2)$$

Where $\zeta$ is the weighted sum of the inputs (e.g., the inner product of the input vector and the tap-weight vector), and $\sigma(\zeta)$ is a function of the weighted sum. Where the weight and input elements form vectors w and x, the $\zeta$ weighted sum becomes a simple dot product:

$$\zeta = w \cdot x \quad (3)$$

This may be referred to as either the activation function (e.g., in the case of a threshold comparison) or a transfer function. In some embodiments, one or more PEs can be referred to as a dot product engine. The input (e.g., input data 110) to the neural network 114, x, can come from an input space and the output (e.g., output data 112) are part of the output space. For some neural networks, the output space Y may be as simple as {0, 1}, or it may be a complex multi-dimensional (e.g., multiple channel) space (e.g., for a convolutional neural network). Neural networks tend to have one input per degree of freedom in the input space, and one output per degree of freedom in the output space.

In some embodiments, the PEs can be arranged and/or implemented as a systolic array. A systolic array can be a network (e.g., a homogeneous network) of coupled data processing units (DPUs) such as PEs, called cells or nodes. Each node or PE can independently compute a partial result as a function of the data received from its upstream neighbors, can store the result within itself and can pass the result downstream for instance. The systolic array can be hard-wired or software configured for a specific application. The nodes or PEs can be fixed and identical, and interconnect of the systolic array can be programmable. Systolic arrays can rely on synchronous data transfers.

Referring again to FIG. 1B, the input x to a PE 120 can be part of an input stream 132 that is read or accessed from a storage device 126 (e.g., SRAM). An input stream 132 can be directed to one row (horizontal bank or group) of PEs, and can be shared across one or more of the PEs, or partitioned into data portions (overlapping or non-overlapping data portions) as inputs for respective PEs. Weights 134 (or weight information) in a weight stream (e.g., read from the storage device 126) can be directed or provided to a column (vertical bank or group) of PEs. Each of the PEs in the column may share the same weight 134 or receive a corresponding weight 134. The input and/or weight for each target PE can be directly routed (e.g., from the storage device 126) to the target PE (e.g., without passing through other PE(s)), or can be routed through one or more PEs (e.g., along a row or column of PEs) to the target PE. The output of each PE can be routed directly out of the PE array (e.g., without passing through other PE(s)), or can be routed through one or more PEs (e.g., along a column of PEs) to exit the PE array. The outputs of each column of PEs can be summed or added at an adder circuitry of the respective column, and provided to a buffer 130 for the respective column of PEs. The buffer(s) 130 can provide, transfer, route, write and/or store the received outputs to the storage device 126. In some embodiments, the outputs (e.g., activation data from one layer of the neural network) that are stored by the storage device 126 can be retrieved or read from the storage device 126, and be used as inputs to the array of PEs 120 for processing (of a subsequent layer of the neural network) at a later time. In certain embodiments, the outputs that are stored by the storage device 126 can be retrieved or read from the storage device 126 as output data 112 for the AI accelerator 108.

Figure 1C:
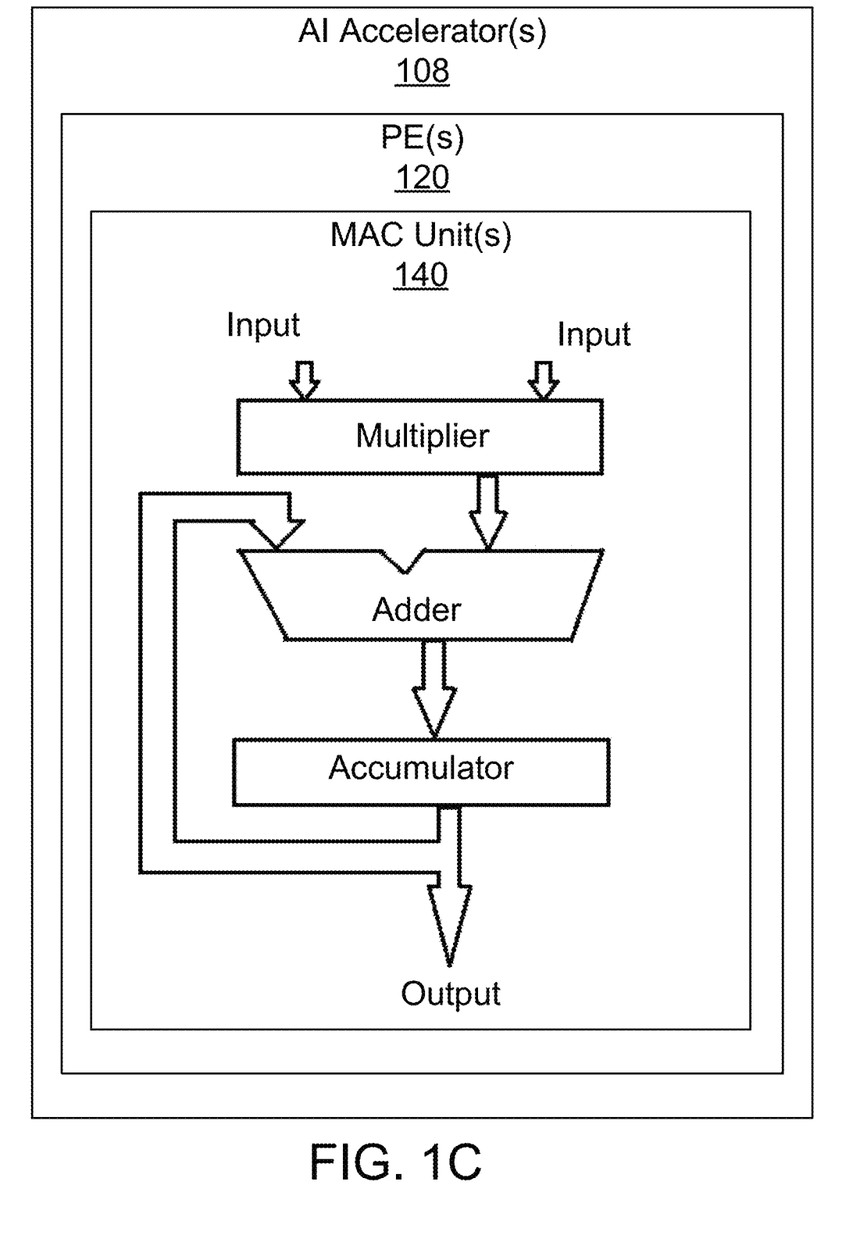
FIG. 1C is a block diagram of an embodiment of a device for performing AI related processing, according to an example implementation of the present disclosure.

Referring now to FIG. 1C, one example embodiment of a device for performing AI related processing is depicted. In brief overview, the device can include or correspond to an AI accelerator 108, e.g., with one or more features described above in connection with FIGS. 1A and 1B. The AI accelerator 108 can include one or more PEs 120, other logic or circuitry (e.g., adder circuitry), and/or other structures or constructs (e.g., interconnects, data buses, clock circuitry, power network(s)). Each of the above-mentioned elements or components is implemented in hardware, or at least a combination of hardware and software. The hardware can for instance include circuit elements (e.g., one or more transistors, logic gates, registers, memory devices, resistive elements, conductive elements, capacitive elements, and/or wire or electrically conductive connectors).

In some embodiments, a PE 120 can include one or more multiply-accumulate (MAC) units or circuits 140. One or more PEs can sometimes be referred to (singly or collectively) as a MAC engine. A MAC unit is configured to perform multiply-accumulate operation(s). The MAC unit can include a multiplier circuit, an adder circuit and/or an accumulator circuit. The multiply-accumulate operation computes the product of two numbers and adds that product to an accumulator. The MAC operation can be represented as follows, in connection with an accumulator operand a, and inputs b and c:

$$a \leftarrow a + (b \times c) \quad (4)$$

In some embodiments, a MAC unit 140 may include a multiplier implemented in combinational logic followed by an adder (e.g., that includes combinational logic) and an accumulator register (e.g., that includes sequential and/or combinational logic) that stores the result. The output of the accumulator register can be fed back to one input of the adder, so that on each clock cycle, the output of the multiplier can be added to the accumulator register.

As discussed above, a MAC unit 140 can perform both multiply and addition functions. The MAC unit 140 can operate in two stages. The MAC unit 140 can first compute the product of given numbers (inputs) in a first stage, and forward the result for the second stage operation (e.g., addition and/or accumulate). An n-bit MAC unit 140 can include an n-bit multiplier, 2n-bit adder, and 2n-bit accumulator. An array or plurality of MAC units 140 (e.g., in PEs) can be arranged in a systolic array, for parallel integration, convolution, correlation, matrix multiplication, data sorting, and/or data analysis tasks.

Figure 1D:
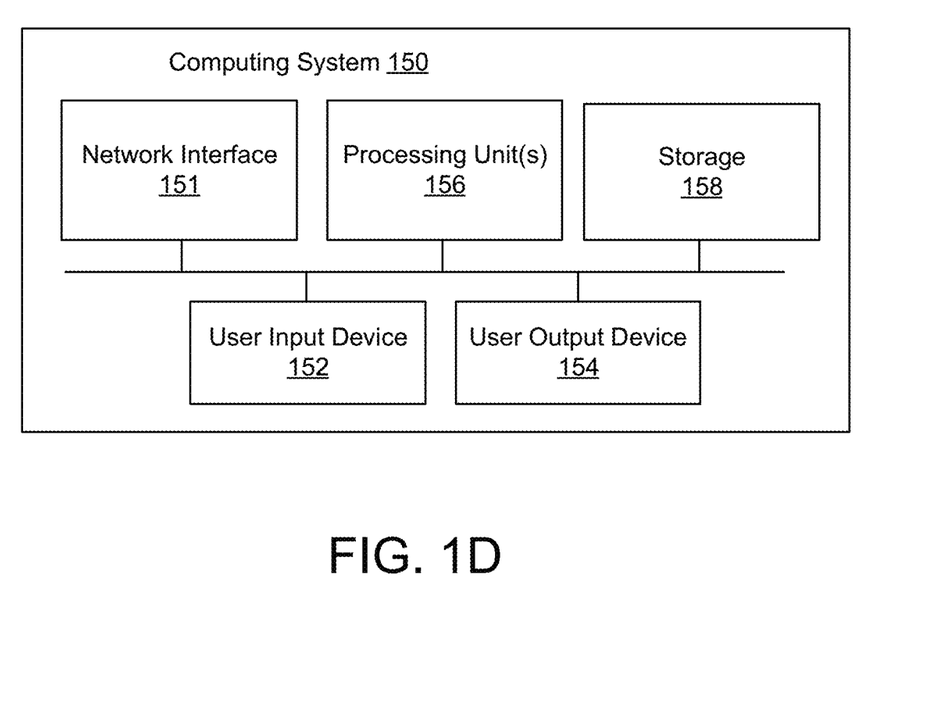
FIG. 1D is a block diagram of a computing environment according to an example implementation of the present disclosure.

Various systems and/or devices described herein can be implemented in a computing system. FIG. 1D shows a block diagram of a representative computing system 150. In some embodiments, the system of FIG. 1A can form at least part of the processing unit(s) 156 (or processors 156) of the computing system 150. Computing system 150 can be implemented, for example, as a device (e.g., consumer device) such as a smartphone, other mobile phone, tablet computer, wearable computing device (e.g., smart watch, eyeglasses, head mounted display), desktop computer, laptop computer, or implemented with distributed computing devices. The computing system 150 can be implemented to provide VR, AR, MR experience. In some embodiments, the computing system 150 can include conventional, specialized or custom computer components such as processors 156, storage device 158, network interface 151, user input device 152, and user output device 154.

Network interface 151 can provide a connection to a local/wide area network (e.g., the Internet) to which network interface of a (local/remote) server or back-end system is also connected. Network interface 151 can include a wired interface (e.g., Ethernet) and/or a wireless interface implementing various RF data communication standards such as Wi-Fi, Bluetooth, or cellular data network standards (e.g., 3G, 4G, 5G, LTE, etc.).

User input device 152 can include any device (or devices) via which a user can provide signals to computing system 150; computing system 150 can interpret the signals as indicative of particular user requests or information. User input device 152 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 154 can include any device via which computing system 150 can provide information to a user. For example, user output device 154 can include a display to display images generated by or delivered to computing system 150. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. User output devices 154 can be provided in addition to or instead of a display. Examples include indicator lights, speakers, tactile "display" devices, printers, and so on.

Some implementations include electronic components, such as microprocessors, storage and memory that store computer program instructions in a non-transitory computer readable storage medium. Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 156 can provide various functionality for computing system 150, including any of the functionality described herein as being performed by a server or client, or other functionality associated with message management services.

It will be appreciated that computing system 150 is illustrative and that variations and modifications are possible. Computer systems used in connection with the present disclosure can have other capabilities not specifically described here. Further, while computing system 150 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

B. Methods and Devices for Multiply-Accumulate Operations for Neural Networks

Disclosed herein include embodiments of a system, a method, and a device for multiply-accumulate operations for neural networks based on a counter or an incrementor. In some aspects, this disclosure is directed to improving efficiency in accumulation operation of a multiply-accumulate (MAC) unit in a neural network, implemented in an AI accelerator for instance. A MAC unit may perform multiplications of weights with corresponding activations and accumulation of different multiplication results. Accumulation of different multiplication results may involve a large number of bits, and may be computationally exhaustive and power inefficient. In one aspect, an output of an accumulation adder can be divided into two portions, a least significant bit (LSB) portion and a most significant bit (MSB) portion. The LSB portion can be added with a multiplication result. Meanwhile, a multiplexer can receive the MSB portion and a summation of the MSB portion incremented by one (e.g., 1 bit, or some other value) for example. Depending on the carry output of the sum of the LSB portion and the multiplication result (which can be provided as an overflow indication or overflow bit of an accumulation adder that performs the summation), the multiplexer can output either the MSB portion or the summation of the MSB portion incremented by one. Then, the output of the multiplexer can be combined with the sum of the LSB portion and the multiplication result as the output of the accumulation adder. In some embodiments, multiple possible increment values for summation with the MSB portion can be implemented to provide additional inputs to the multiplexer for selection according to the carry output (which can have three or more possible values for instance).

Advantageously, such an accumulation adder can improve operation speed and reduce latency. For example, accumulation by a conventional approach involves propagating a carry through a large number of bits. Propagating a carry through a large number of bits may delay the process of accumulation. By performing accumulation only on the LSB portion for instance, and selecting either i) the MSB portion or ii) the MSB portion incremented by one, according to the carry output from the accumulation of LSB portion, a carry can be propagated through a fewer number of bits than in a conventional approach. Hence, a critical path for performing accumulation operation can be reduced by propagating a carry through a fewer number of bits.

In one aspect, the input data is a multiplication result from multiplying weight with a corresponding activation value or an activation function. Appended data may be applied as accumulated data for a next clock cycle. Hence, in one embodiment, a multiplication result from multiplying weight with a corresponding activation value or an activation function can be added for a clock cycle, and additional multiplication results for multiplying another weight with a corresponding activation value or an activation function can be added for a subsequent clock cycle.

Figure 2:
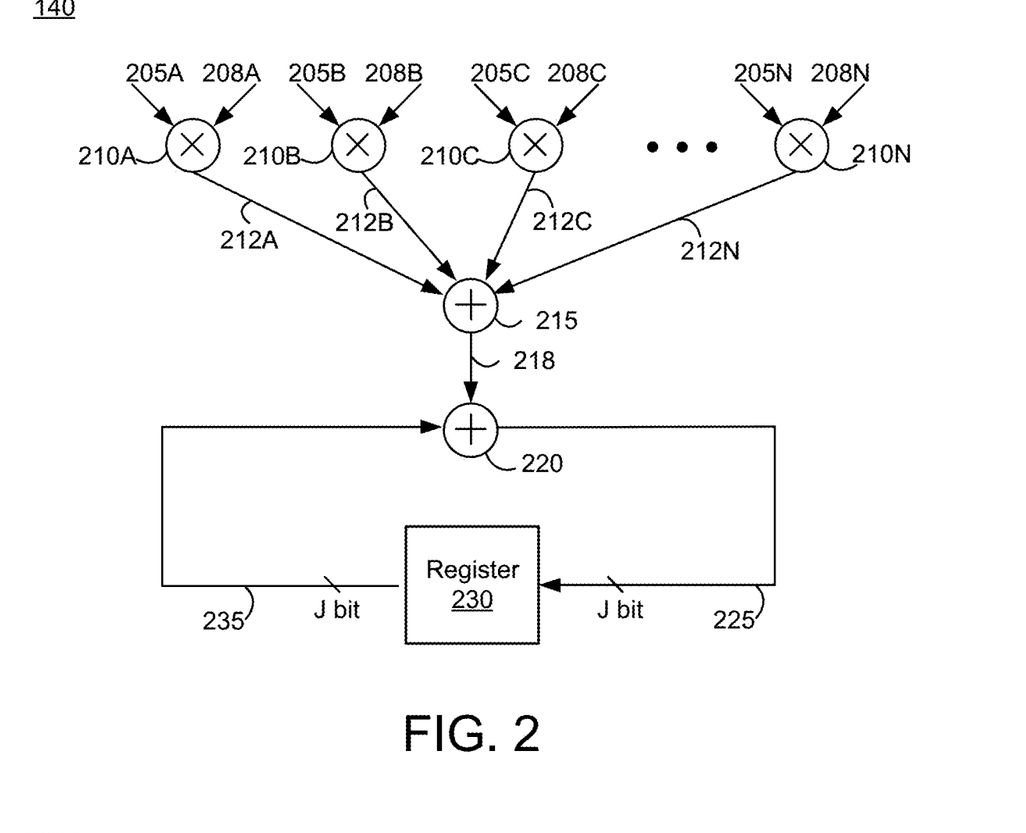
FIG. 2 is a block diagram of a multiply-accumulate (MAC) unit of FIG. 1C, according to an example implementation of the present disclosure.

Referring to FIG. 2, illustrated is a block diagram of a multiply-accumulate (MAC) unit 140 of FIG. 1C, according to an example implementation of the present disclosure. In some embodiments, the MAC unit 140 includes multiplier circuitries 210A, 210B, 210C . . . 210N, adder circuitry 215, an accumulator 220, and a register 230. These components operate together to receive weights 205A, 205B . . . 205N and activation values 208A, 208B . . . 208N to generate appended data 225 (also referred to as "updated accumulated data 225"), for example, as described above with respect to Eq. (4). In other embodiments, the MAC unit 140 includes more, different, or fewer components than shown in FIG. 2. For example and in some embodiments, the adder circuitry 215 may be omitted, and the outputs of the multiplier circuitries 210 may be provided to the accumulator 220 as input data.

In one configuration, each multiplier circuitry 210X receives a weight 205X and an activation value 208X and multiplies the weight 205X and the activation value 208X to generate a multiplication result 212X, which is provided to the adder circuitry 215. The adder circuitry 215 may add the multiplication results from the multiplier circuitries 210A-210N to generate a summation data 218, and provide the summation data 218 to the accumulator 220 as an input data. In one configuration, the accumulator 220 receives the summation data 218 from the adder circuitry 215 and accumulated data 235 from the register 230 to generate appended data (or updated accumulated data 225) and provide the appended data (or the updated accumulated data 225) to the register 230.

In one approach, the multiply-accumulation operation is performed for each clock cycle. For example, the multiplier circuitries 210A-210N may receive a set of weights 205A-205N and a corresponding set of activation values 208A-208N during a clock cycle, and multiply the set of weights 205A-205N with the corresponding set of activation values 208A-208N to generate a set of multiplication results 212A-212N during the clock cycle. The adder circuitry 215 may add the set of multiplication results from the multiplier circuitries 210A-210N to generate summation data 218, and provide the summation data 218 to the accumulator 220 during the clock cycle. The accumulator 220 may add the summation data 218 with the accumulated data 235 to generate the updated accumulated data 225, and provide the updated accumulated data 225 to the register 230. The register 230 may output the updated accumulated data 225 received during the clock cycle, as the accumulated data 235 during the subsequent clock cycle. The multiplier circuitries 210A-210N, the adder circuitry 215, the accumulator 220, and the register 230 may repeat the process for an additional set of weights and a corresponding set of activation values 208 during the subsequent clock cycle. Assuming for instance that inputs of a neuron or a node is coupled to outputs of 50 neurons or nodes, the MAC unit 140 may employ 10 multiplier circuitries 210 (e.g., N is 10) that can perform computations in parallel for a clock cycle, such that the MAC unit 140 can perform multiply-accumulation operations of 50 weights and 50 activation values in 5 clock cycles.

In one implementation, accumulation of a large number of bits by the accumulator 220 may be computationally inefficient. Assuming for an example that the weight 205 has 8 bits and the activation value has 8 bits, then the multiplication result 212 has 16 bits. For N number of additions, the summation data 218 has a K number of bits corresponding to ceil(16+log 2N), where ceil( ) is a ceiling function. Moreover, accumulating the summation data 218 renders the accumulated data 235 to have a J number of bits (e.g., 28 bits) larger than the K number of bits. In one implementation, the accumulator 220 includes J number of adders to add the summation data 218 having a fixed K number of bits to the K number of bits of an LSB portion of the accumulated data, and propagate a carry through the remaining bits of the accumulated data. However, performing addition through the J number of adders may be slow and consume a large amount of power.

Advantageously, the disclosed accumulator 220 improves computational speed and efficiency by segregating the accumulated data into two portions, where the first portion is added with the input data, and either i) the second portion or ii) the second portion added by a predetermined value (e.g., '1') is selected according to a carry value from the addition. By obviating addition or accumulation for a larger number of bits, a critical path for the accumulation can be reduced to improve operation speed or improve power efficiency, as described below with respect to FIGS. 3A and 3B below.

Figure 3A:
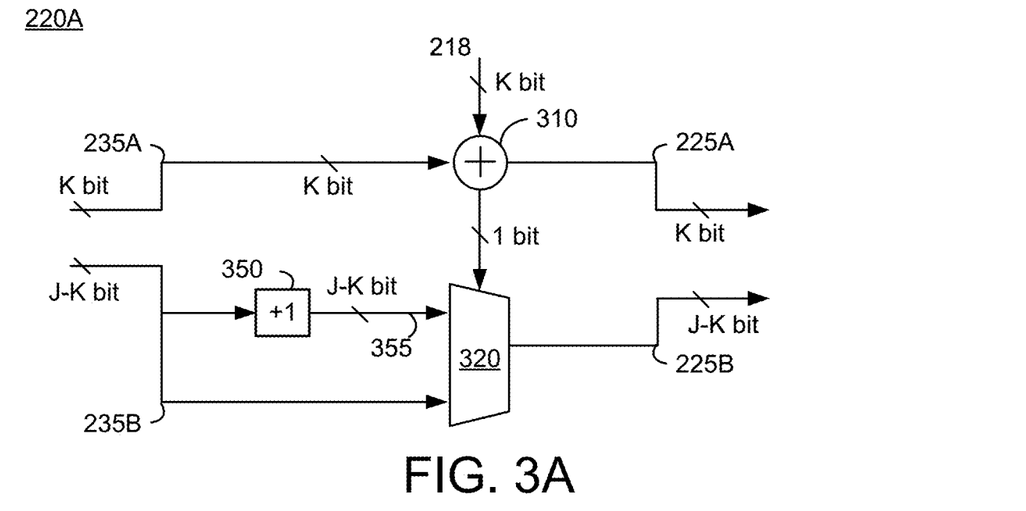
FIG. 3A is a block diagram of an accumulator of FIG. 2, according to an example implementation of the present disclosure.

Referring to FIG. 3A, illustrated is a block diagram of the accumulator 220A of FIG. 2, according to an example implementation of the present disclosure. In some embodiments, the accumulator 220A includes a K bit adder circuitry 310, a J-K bit incrementor 350, and a J-K bit multiplexer 320. J-K can refer to a difference between the value of J and the value of K. These components can operate together to receive the summation data 218 or the multiplication result 212 as input data, and accumulated data 235, and can generate updated accumulated data 225 equivalent to a sum of the summation data 218 and the accumulated data 235. In some example embodiments, J is 28 and K is between 16 and 20. In other embodiments, the accumulator 220A includes more, fewer, or different components than shown in FIG. 3A.

The K bit adder circuitry 310 can be or include a component that receives a first portion of the accumulated data 235A and input data 218, and can add the first portion of the accumulated data 235A with the input data 218 to generate a first portion of updated accumulated data 225A. For example, the K bit adder circuitry 310 receives K bits of a LSB portion of the accumulated data 235A from the register 230 and input data 218 having K bits from the adder circuitry 215 to generate K bits of a LSB portion of the updated accumulated data 225A. The K bit adder circuitry 310 may provide the K bits of the LSB portion of the updated accumulated data 225A to the register 230.

The J-K bit multiplexer 320 can be or include a component, switch or circuitry that selects between inputs: i) a second portion of the accumulated data 235B and ii) incremented data 355, according to a carry value of the addition from the K bit adder circuitry 310, to provide as an output. In one aspect, the incrementor 350 (or a counter) receives the second portion of the accumulated data 235B, and increments the second portion of the accumulated data 235B by a predetermined value (e.g., '1' or other value) to generate the incremented data 355. For example, the J-K bit multiplexer 320 can receive J-K bits of MSB portion of the accumulated data 235B and incremented data 355 having J-K number of bits, and can select between i) the J-K bits of MSB portion of the accumulated data 235B and ii) the incremented data 355 having J-K number of bits, according to the carry value. In one configuration, a one-bit carry output of the K bit adder circuitry 310 can be coupled to a control input of the J-K bit multiplexer 320. In response to the carry value being '1', the J-K bit multiplexer 320 may select the incremented data 355. Similarly, in response to the carry value being '0', the J-K bit multiplexer 320 may select the second portion of the accumulated data 235B.

By segregating computations into two portions (e.g., LSB portion and MSB portion) performed in parallel, an addition or an accumulation can be performed by the K bit adder circuitry 310 for a reduced number of bits (e.g., for the LSB portion) to improve operation speed and achieve computational efficiency. Specifically, the critical path for the K bit adder circuitry 310 can be reduced, compared to a full J bit adder circuitry. In one aspect, J-K may be less than K, such that the output of the multiplexer 320 can be selected immediately after the carry value at the carry output of the K bit adder circuitry 310 is generated. Accordingly, the accumulator 220A can achieve a low critical path for the accumulation to improve operation speed and power efficiency.

Figure 3B:
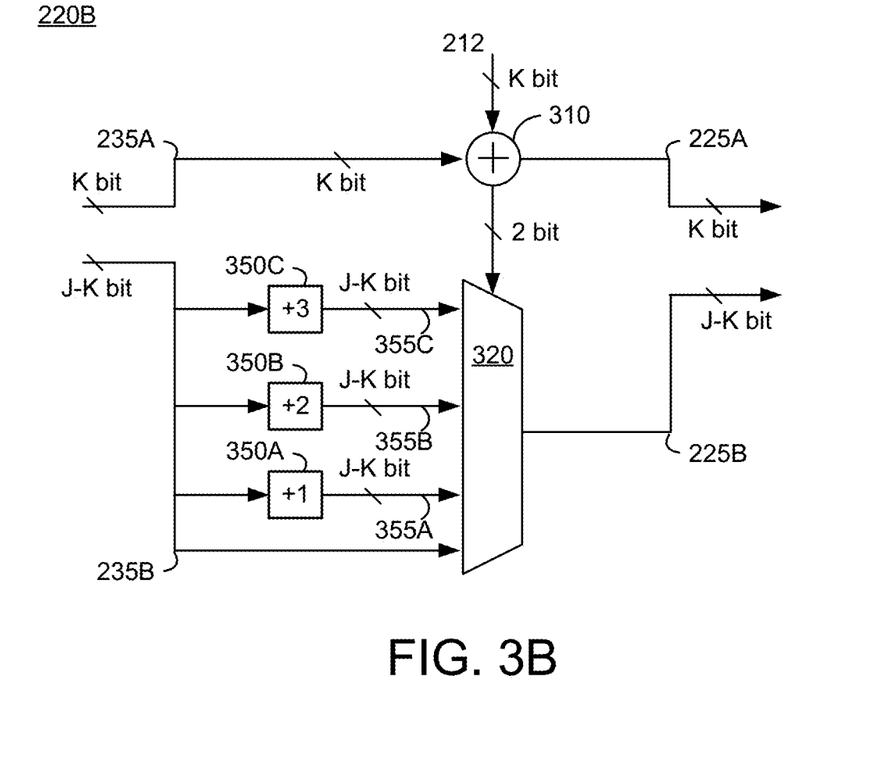
FIG. 3B is a block diagram of an accumulator of FIG. 2, according to an example implementation of the present disclosure.

Referring to FIG. 3B, illustrated is a block diagram of the accumulator 220B of FIG. 2, according to an example implementation of the present disclosure. The accumulator 220B of FIG. 3B is similar to the accumulator 220A of FIG. 3A, except that the adder circuitry 310 may add the first portion of the accumulated data 235A with a plurality of multiplication results 212 (or a plurality of summation data 218) to generate a carry value having multiple bits, and the multiplexer 320 may select and output one from more than two input data, according to the carry value having multiple bits.

In one example implementation, the adder circuitry 310 may add the accumulated data 235A with three or four multiplication results 212 from different multipliers 210, simultaneously or sequentially. By adding the accumulated data 235A with three or four multiplication results 212, the adder circuitry 310 may generate the carry value having two bits. The multiplexer 320 may receive the second portion of the accumulated data 235B and incremented data 355A, 355B, 355C from different incrementers 350A, 350B, 350C (or counters). The incrementer 350A may receive and increment the second portion of the accumulated data 235B by '1' to generate the incremented data 355A, the incrementer 350B may receive and increment the second portion of the accumulated data 235B by '2' to generate the incremented data 355B, and the incrementer 350C may receive and increment the second portion of the accumulated data 235C by '3' to generate the incremented data 355C. Alternatively, the incrementers 350A, 350B, 350C are connected in series or in cascade, such that the incrementer 350A may receive and increment the second portion of the accumulated data 235B by '1' (or other value) to generate the incremented data 355A, the incrementer 350B may receive and increment the incremented data 355A by '1' (or other value) to generate the incremented data 355B, and the incrementer 350C may receive and increment the incremented data 355B by '1'(or other value) to generate the incremented data 355C.

In one aspect, the multiplexer 320 may select one from its multiple input data, according to the carry value at its control input. For example, if the carry value is '00', the multiplexer 320 may select and output the second portion of the accumulated data 235B. For another example, if the carry value is '01', the multiplexer 320 may select and output the incremented data 355A. For another example, if the carry value is '10', the multiplexer 320 may select and output the incremented data 355B. For another example, if the carry value is '11', the multiplexer 320 may select and output the incremented data 355C. By performing accumulation of a plurality of multiplication results 212 and selecting a MSB portion according to a carry value having multiple bits, an operation speed of the accumulator 220B can be further improved. Although in FIG. 3B, the multiplexer 320 receives a carry value having two bits, then selects and outputs one of four inputs 235B, 355A, 355B, 355C according to the carry value, in other embodiments, the multiplexer 320 may receive a carry value having any number of bits, then select and output one of any number of inputs according to the carry value.

Figure 4:
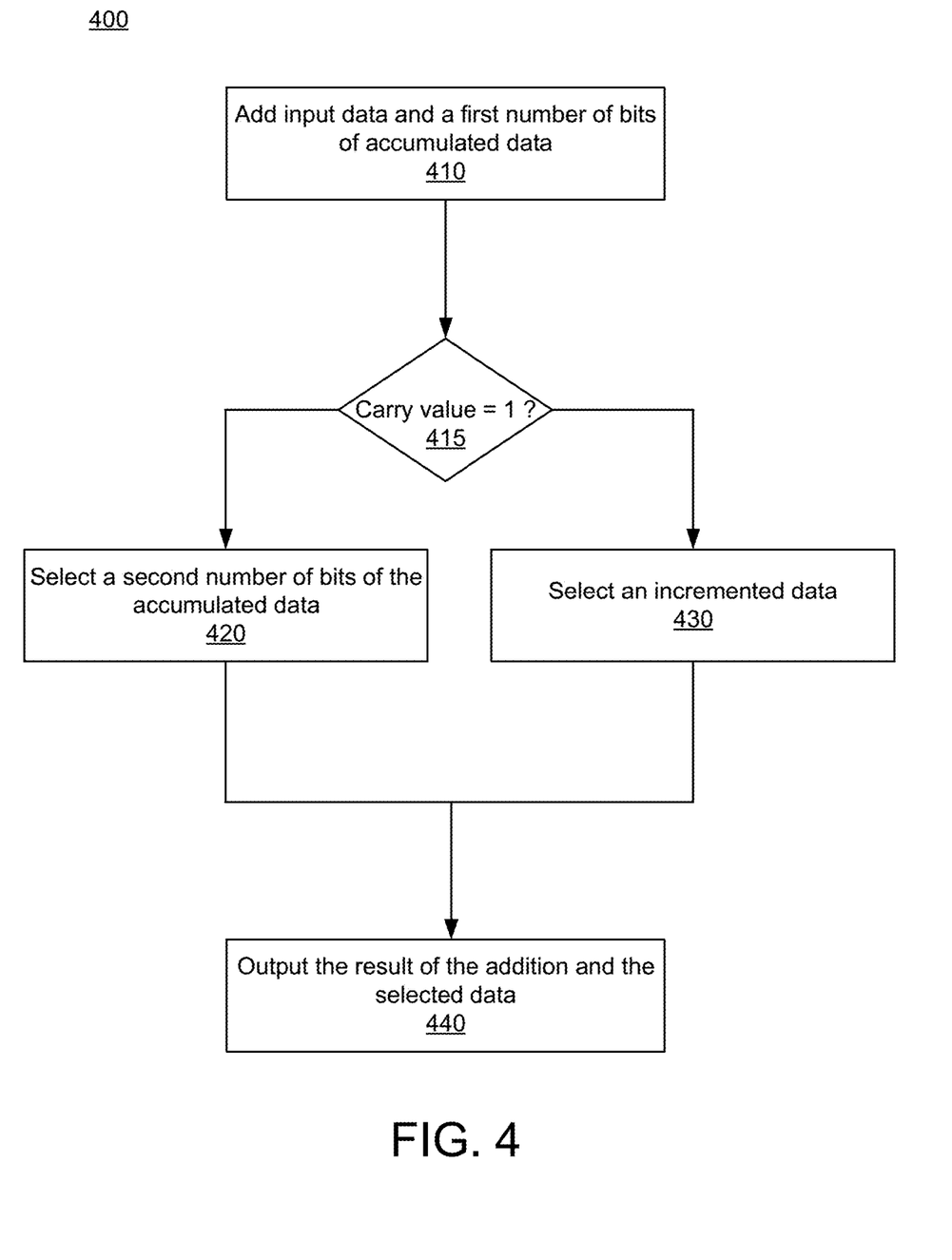
FIG. 4 is a flow chart illustrating a process of performing multiply-accumulate operation for a neural network, according to an example implementation of the present disclosure.

Referring to FIG. 4, illustrated is a flow chart illustrating a process 400 of performing multiply-accumulate operation for a neural network, according to an example implementation of the present disclosure. In some embodiments, the process 400 is performed by the accumulator 220 of FIG. 3A or FIG. 3B. In some embodiments, the process 400 is performed by one or more other entities. In some embodiments, the process 400 includes more, fewer, or different steps than shown in FIG. 4.

In one approach, the accumulator 220 adds 410 input data and a first number of bits of accumulated data. The input data may be generated, obtained, computed, or received from processing of a neural network. For example, the input data may be a result from multiplying a weight and a corresponding activation value. The input data may have K bits, where the accumulated data may have J bits higher than the K bits. The accumulator 220 may add K bits of a LSB portion of the accumulated data with the input data having K bits. In one aspect, J-K (e.g., difference between the value of J and the value of K) is equal to or less than K.

In one approach, the accumulator 220 can check or confirm 415 whether a carry value from the addition in the step 410 is a predetermined threshold (e.g., '1') to control selection. The accumulator 220 may select between i) a second number of bits of the accumulated data and ii) incremented data, according to a carry value from the addition in the step 410, according to the carry value being "1" or "0". In one approach, the accumulator 220 receives the second portion of the accumulated data, and increments the second portion of the accumulated data by a predetermined value (e.g., '1') to generate the incremented data. For example, the accumulator 220 receives J-K bits of MSB portion of the accumulated data and incremented data having J-K number of bits and selects between i) the J-K bits of MSB portion of the accumulated data 235B and ii) the incremented data 355 having J-K bits, according to the carry value. For example, in response to the carry value from the addition in the step 410 being '0', the accumulator 220 may select 420 the second portion of the accumulated data 235B. For example, in response to the carry value from the addition in the step 410 being '1', the accumulator 220 may select 430 the incremented data 355.

In one approach, the accumulator 220 can output 440, generate and/or provide the result of the addition in the step 410 with the selected data in the step 420 as updated accumulated data or appended data. For example, the result of the addition has K number of bits that corresponds to K bits of the LSB portion of the appended data, and the selected data has J-K number of bits that corresponds to J-K bits of the MSB portion of the appended data. The accumulator 220 may send, output, convey, direct and/or provide the appended data to a register (e.g., register 230 of FIG. 2, which can be an array or a bank of registers that can be activated by a clock signal). In one aspect, the appended data for a clock cycle may be received by the accumulator 220 as an accumulated data in a subsequent clock cycle through the register. For example, a K number of bits of the appended data from an output of an adder circuitry (e.g., the adder circuitry 310 of FIG. 3A) may be provided to an input of the adder circuitry for a subsequent clock cycle through the register. Similarly, a J-K number of bits of the appended data from an output of the multiplexer (e.g., the multiplexer 320 of FIG. 3A) may be sent, fed, or provided to an input of the multiplexer for a subsequent clock cycle through the register.

In some embodiments, the input data is produced, derived, generated and/or provided by multiplying first data and second data. The first data may be or include a weight of (e.g., a node of a layer of) the neural network, and the second data may be an activation value of (e.g., the node of the layer of) the neural network. In one aspect, the first data has M number of bits and the second data has M number of bits, where the input data has K number of bits that is at least twice of the M number of bits.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A multiply and accumulate circuit for a neural network comprising:
    adder circuitry configured to generate summation data by adding input data from processing of the neural network and a first number of bits of accumulated data for the neural network; and
    a multiplexer configured to select, according to a carry value of the adding by the adder circuitry, between i) a second number of bits of the accumulated data and ii) incremented data comprising the second number of bits of the accumulated data incremented by a predetermined value, the summation data appended with the selected one of the second number of bits of the accumulated data or the incremented data forming appended data.

2. The multiply and accumulate circuit of claim 1, wherein the multiplexer is configured to select the second number of bits of the accumulated data, in response to the carry value of the adding being zero.

3. The multiply and accumulate circuit of claim 1, wherein the multiplexer is configured to select the incremented data, in response to the carry value of the adding being one.

4. The multiply and accumulate circuit of claim 1, wherein the adder circuitry is configured to provide the first number of bits of the appended data to an input of the adder circuitry for a subsequent clock cycle.

5. The multiply and accumulate circuit of claim 1, wherein the multiplexer is configured to provide the second number of bits of the appended data to an input of the multiplexer for a subsequent clock cycle.

6. The multiply and accumulate circuit of claim 5, further comprising:
    incrementing circuitry configured to increment the second number of bits of the appended data by one to generate the incremented data and provide the incremented data to an additional input of the multiplexer.

7. The multiply and accumulate circuit of claim 1, wherein the multiplexer includes a control input coupled to a carry output of the adder circuitry, the multiplexer configured to receive, at the control input, the carry value of the adding from the carry output of the adder circuitry.

8. The multiply and accumulate circuit of claim 1, further comprising:
    multiplier circuitry including an output coupled to an input of the adder circuitry, the multiplier circuitry configured to multiply first data and second data to generate the input data.

9. The multiply and accumulate circuit of claim 8, wherein the first data is weight of the neural network and the second data is an activation value of the neural network.

10. The multiply and accumulate circuit of claim 8, wherein the first data has a third number of bits, and the second data has the third number of bits, the first number being twice of the third number.

11. A method for a neural network comprising:
    adding, by adder circuitry, input data from processing of the neural network and a first number of bits of accumulated data for the neural network to generate summation data; and
    selecting, by a multiplexer, according to a carry value of the adding from the adder circuitry, between i) a second number of bits of the accumulated data and ii) incremented data comprising the second number of bits of the accumulated data incremented by a predetermined value, the summation data appended with the selected one of the second number of bits of the accumulated data or the incremented data forming appended data.

12. The method of claim 11, wherein the selecting includes selecting, by the multiplexer, the second number of bits of the accumulated data, in response to the carry value of the adding being zero.

13. The method of claim 11, wherein the selecting includes selecting, by the multiplexer, the incremented data, in response to the carry value of the adding being one.

14. The method of claim 11, further comprising:
    providing, by the adder circuitry, the first number of bits of the appended data from an output of the adder circuitry to an input of the adder circuitry for a subsequent clock cycle.

15. The method of claim 11, further comprising:
    providing, by the multiplexer, the second number of bits of the appended data from an output of the multiplexer to an input of the multiplexer for a subsequent clock cycle.

16. The method of claim 15, further comprising:
incrementing, by incrementing circuitry, the second number of bits of the accumulated data from the output of the multiplexer by one to generate the incremented data; and
providing, by the incrementing circuitry, the incremented data to an additional input of the multiplexer.

17. The method of claim 11, further comprising:
receiving, at a control input of the multiplexer, the carry value of the adding from a carry output of the adder circuitry.

18. The method of claim 11, further comprising:
multiplying, by multiplier circuitry, first data and second data to generate the input data.

19. The method of claim 18, wherein the first data is weight of the neural network and the second data is an activation value of the neural network.

20. The method of claim 18, wherein the first data has a third number of bits, and the second data has the third number of bits, the first number being twice of the third number.

* * * * *